United States Patent [19]

Vangalis

[11] 3,785,706
[45] Jan. 15, 1974

[54] PRESSURIZED HUB CAP FOR VEHICLE WHEEL

[76] Inventor: Dan P. Vangalis, 25402 Westborne, Dana Point, Calif. 92629

[22] Filed: Mar. 6, 1972

[21] Appl. No.: 232,001

[52] U.S. Cl. .......................... 301/108 A, 184/45 R
[51] Int. Cl. ............................................. B60b 5/02
[58] Field of Search ............ 301/123, 108 R, 108 A, 301/108 TW; 184/41, 45; 308/187.1

[56] References Cited
UNITED STATES PATENTS

| | | | |
|---|---|---|---|
| 1,717,543 | 6/1929 | Barricklow | 184/45 R |
| 2,657,104 | 10/1953 | Kayser | 301/123 |
| 3,077,948 | 2/1963 | Law | 301/108 R |
| 3,149,883 | 9/1964 | Reilly | 301/108 A |
| 3,311,430 | 3/1967 | Christensen | 308/187.1 |
| 3,380,791 | 4/1968 | Peck | 301/108 A |
| 3,498,413 | 3/1970 | Krieger | 184/45 R |
| 3,510,138 | 5/1970 | Bowen | 308/187.1 |
| 3,685,838 | 8/1972 | Malmstrom | 308/187.1 |

Primary Examiner—Richard J. Johnson
Assistant Examiner—Reinhard J. Eisenzopf
Attorney—Allan R. Fowler et al.

[57] ABSTRACT

There is disclosed herein a pressurized hub cap for vehicle wheels, particularly for boat trailers the wheel hubs of which are subjected to immersion in water in the launching and retrieval of boats. The hub cap is of transparent plastic, is closed at the outer end and contains a spring-backed piston for applying pressure on lubricant grease in the hub cap and for yielding upon the occurrence of expansion of the lubricant in the hub cap. The hub cap is provided with two small vents, one for permitting lubricant to escape when expansion is excessive and the other to vent the enclosed portion of the hub behind the piston to atmospheric pressure.

4 Claims, 3 Drawing Figures

PATENTED JAN 15 1974   3,785,706

PRESSURIZED HUB CAP FOR VEHICLE WHEEL

BACKGROUND OF THE INVENTION

Trailers that are used for hauling small pleasure boats present special problems with regard to the integrity of their wheel hubs. The reason for this is that in order to launch and retrieve the boat the trailers are backed down a ramp and into the water to an extent that usually results in complete submersion of their wheel hubs. This introduces the possibility of water entering the hubs, and resultant occurrence of corrosion of the metal parts of the hub as well as the intermixture of foreign matter in addition to water with the lubricant contained in the hub.

An approach to the solution of this problem is disclosed in U.S. Pat. No. 3,077,948 granted Feb. 19, 1963, to Law. This patent discloses an open-ended metal hub cap for a hub having a spring-backed piston for applying pressure to grease contained in the hub and in the cap. A ring retained in the open-ended cap serves as the backing for the spring and exposes the spring to view. The piston is metallic and a seal is effected between the open-ended hub cap and the piston by placing in an annular groove on the inside of the hub an O-ring of slightly greater cross-sectional diameter than the depth of the groove so that the piston, as it slides inside the open-ended hub cap, makes a sealing contact with the O-ring by slightly compressing the ring.

SUMMARY OF THE INVENTION

The present invention overcomes disadvantages of the above-described hub cap for a boat trailer hub. It is comprised of a transparent molded plastic hub cap in the form of a cylindrical cup. It includes a resilient flared piston which is backed by a rigid disc, and a compression spring is interposed between the back of the disc and the closed outer end of the hub cap. The wall of the hub cap is provided with two small venting holes, one at a point in the hub cap that is occupied by the spring, for the purpose of venting the hub cap to atmospheric pressure as the piston moves back and forth, and the other in a location farther from the hub then the normal working location of the piston, so that the portion of the hub cap that is occupied by grease is sealed off, but in such a location that if excessive expansion of the grease in the hub cap occurs, as for example due to heating of the hub, some of the grease may escape to the outer surface of the hub cap, from which it may be wiped away. In contrast to the previously known boat trailer hub cap it should be noted that lubricant expelled from the cap through the vent drips away or accumulates on the outer surface of the hub cap from which it may be removed by wiping whereas in the previously known device the only escape for lubricant is past the O-ring and into the portion of the open-ended hub cap where the backing spring is located, and where the grease will coat the spring and collect dust and be difficult to remove. In accordance with the present invention a simplification has been effected by making the piston self-sealing relative to the inner surface of the hub cap, eliminating the necessity for the provision of any supplementary sealing device and simplifying the interior of the hub cap itself. Also, with a transparent hub cap, the condition and quantity of the lubricant inside the hub cap may be observed without removing the cap.

DESCRIPTION OF THE DRAWINGS

For a more complete understanding of the invention, reference may be had to the following detailed description to be interpreted in the light of the accompanying drawings wherein.

DETAILED DESCRIPTION

Figure 1:
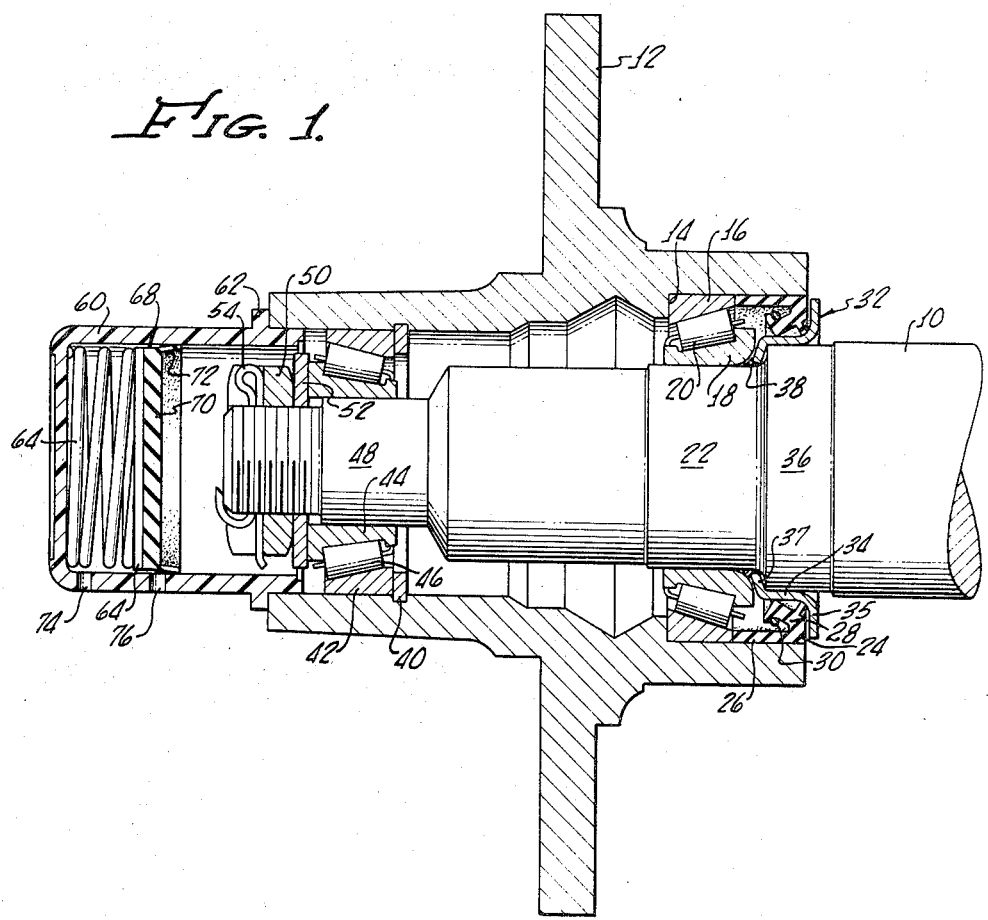
FIG. 1 is a cross-sectional view of a wheel hub mounted on an axle and having associated therewith a hub cap in accordance with the present invention.

Referring now to the drawings and particularly to FIG. 1 the reference numeral 10 designates one of the two outboard portions of an axle which is mounted on a trailer stationarily and has a spindle comprised of several reduced portions which will be identified hereinafter. The spindle supports rotatably a wheel hub 12. At its inner end the hub 12 is bored cylindrically to provide a shoulder 14 against which rests the outer race 16 of an anti-friction bearing structure which comprises, in addition to the outer race 16, an inner race 18 and the bearing elements such as the rollers 20. The outer race 16 of the anti-friction bearing snugly fits into the boring at the inner end of the hub 12 and a reduced portion 22 of the axle 10 snugly fits into the inner race 18.

The bearing structure is retained in the inner end of the hub, and the escape of grease from that portion of the hub is prevented, by a resilient double-lipped seal 24 which is annular in shape and has a skirt portion 26 that is press-fitted into the opening in the hub and abuts the outer race 14 of the anti-friction bearing. The seal 24 has a re-entrant skirt portion 28 which is surrounded by a garter spring 30. The re-entrant skirt 28 is considerably more flexible than the remainder of the seal 24, sufficiently so that the garter spring 30 flexes it radially inwardly of the seal 24.

The seal 24 receives a metallic Z-ring 32, comprising a cylindrical portion 34, a flange 35 extending radially outwardly and a flange 37 extending obliquely inwardly. The cylindrical portion 34 of the Z-ring 32 is dimensioned to fit closely a portion 36 of the spindle portion of the axle 10 of somewhat greater diameter than the portion 22, and the garter spring 30 forces the re-entrant skirt 28 of the seal 24 into engagement with the outer surface of the sylindrical portion 34 of the Z-ring 32, to complete a seal between the seal 24 and the Z-ring 32.

At its outer end the hub 12 is provided with a cylindrical boring and there is provided in the cylindrical surface an annular groove which receives and retains a snap-ring 40. The ring 40 serves as a seat for an outer anti-friction bearing structure which is comprised of an outer race member 42, inner race member 44 and anti-friction bearing elements 46, shown in FIG. 1 as rollers. The dimension of the outer race member 40 of the bearing is such that it fits snugly into the boring in the hub 12 an the internal diameter of the inner race 44 is such that it will snugly engage a reduced portion 48 of the spindle portion of the axle 10. The free end of the spindle is threaded to receive a castellated nut 50 which seats against a washer 52 that is interposed between the inner race member 44 of the anti-friction bearing and the nut 50. It is a usual practice to have a keyway in the threaded portion of the spindle and a key in the washer so that the washer cannot rotate.

When the hub is to be assembled to an axle spindle the inner bearing comprised of the race members 16 and 18 and the rollers 20 is inserted into the rear portion of the hub and seated against the shoulder 14, grease is applied to the exposed face of the bearing structure, after which the double-lipped seal 24 with a garter spring 30 is placed inside the hub and pressed against the outer race 16 of the bearing.

Then the Z-ring 32 is slipped over the spindle and placed in position with the cylindrical portion 34 fitted on the reduced portion 36 and the inwardly extending flange 37 abutting the shoulder separating the reduced portions 22 and 36 of the spindle. An O-ring 38 is next placed on the reduced portion 22 of the axle spindle abutting the flange 37 of the Z-ring 34, and the hub with the inner bearing enclosed therein is fitted on the spindle, the inner race 18 of the inner bearing surrounding the reduced portion 22 of the spindle and the inner face of the inner race 18 coming to rest against the O-ring 38.

The entire hub cavity is then filled with grease, after which the outer anti-friction bearing comprising inner and outer races 44 and 42 respectively, this unit having had grease applied to it, is fitted over the reduced portion 48 of the spindle and into an engagement with the snap-ring 40. The key washer 52 and the nut 50 are then fitted over the end of the spindle and the nut 50 is tightened to the point where there is no end play between hub and spindle, the O-ring 38 taking up the slack, but the nut 50 should not be tightened to such an extent that the hub structure and its bearings bind on the spindle. The installation of the hub on the spindle is completed by the fitting of a retaining cotter pin through a diametrically drilled hole in the threaded portion of the spindle, with which one of several pairs of diametrically opposed slots in the face of the castellated nut has been aligned, after which the tips of the cotter pin are spread to prevent its escape from the drilled hole in the spindle.

The cap for the hub is designated by the reference numeral 60 and it is preferably molded of a transparent polycarbonate plastic. Plastics of this type have high compressive and impact strength, do not deteriorate in the presence of ultraviolet light and are resistent to grease, and are stable at higher temperatures. The hub 60 is cup-shaped, being closed at its outer end, and is provided with a flange 62 to seat against the outer face of the hub 12 and limit the extent of entry of the cap 60 into the hub.

The hub cap 60 encloses a helical compression spring 64 and next to the spring is a stiff disc 66 which may be made of phenolic plastic, and the disc may be paper reinforced. The desired characteristics of the disc are that it be resistant to lubricants and relatively inflexible.

The disc 66 serves as a backing for a piston designated generally by the reference numeral 68. As may be seen in FIGS. 1, 2 and 3 the piston 68 is comprised of a relatively thick body portion 70 and a thin flared skirt portion 72. The piston 68 is flexible in its body portion 70 and in its skirt portion 72, and it must be made of a material that is resistant to swelling or deterioration in the presence of lubricants. Nitrile rubber is a suitable compound from which to make the piston 68.

The piston 68 is placed in the hub cap 60 with the flared skirt 72 facing the open end of the cap and the thick portion 70 of the piston 68 backed by the stiff plastic disc 66 which provides a seat for the piston 68 against the spring 64 and therefore it distributes the pressure applied by the spring on the piston 68 when the spring is compressed. The wall of the hub cap 60 is provided with small orifices 74 and 76, the former being located near the outer end of the cap so that it will be between the disc 66 and the end of the cap 60 even when the spring 64 is fully compressed. The orifice 76 is spaced inwardly of the hub cap 60 relative to thee location of the orifice 74 such that it will be partially or completely uncovered by the skirt 72 of the piston 68, and therefore in communication with the portion of the interior of the cap between the skirt 72 and the open end of the cap, when the piston is moved back toward the closed end of the cap 60 a sufficient distance to fully compress the spring.

When a hub 12 with bearings installed and fully lubricated has been mounted on the spindle of the axle 10, the nut 50 tightened to the proper extent and the cotter pin 54 has been inserted and deformed to prevent rotation of the nut 50 inwardly or outwardly it is ready for the installation of the hub cap 60. The hub cap is first filled with grease flush to its open end. A coating of cement is then applied to the outer surface of the portion of the hub cap 60 that enters the hub 12. A type of cement that has been found to be satisfactory for this purpose is a hardening type identified as number 1 Permatex, a product of the Watson-Standard Company of Pittsburgh, Pennsylvania. The cap 60 is then fitted to the hub 12 until the flange 62 seats against the outer face of the hub. If the hub 12 has been properly filled with grease before the hub cap 60 is fitted into place none of the grease in the hub cap will be able to enter the hub and as soon as the free end of the hub cap 60 enters the hub the grease in the filled hub cap meets the grease in the filled hub and cannot escape from the hub cap to the outside. As the hub cap is pressed into position pressure builds in the grease due to the entry of the hub cap into the hub, and in addition the end of the spindle and the nut 50 displace grease, further increasing the pressure. These additive components of pressure are impressed on the piston 68, forcing it back towards the closed end of the cap 60 and compressing the spring 64 to some extent. The grease normally does not displace the piston 68 sufficiently to enable the skirt 72 of the piston to uncover the grease relief orifice 76. If it does displace the piston sufficiently to permit grease to escape, this indicates that a pressure greater than necessary has been developed in the hub cap, and the escape of grease is no cause for concern. Normally the residual pressure will be in the neighborhood of 2 psi. Only the spring offers resistence to movement of the piston as the pressure is built up in the grease, because the orifice 74 vents to atmospheric pressure the space between the piston backing disc 66 and the closed end of the hub cap 60.

As hereinafter set forth the hub cap shown and described is intended primarily for use on boat trailers which, in the launching of pleasure boats, are backed down a launching ramp and into the water so that the hubs are submerged. In the hauling of the trailer behind a motor vehicle from the place where the boat is kept when not in use, usually the residence of the owner, to the place of launching, heating of the grease due to friction may result in expansion of the grease, which will be accommodated by movement of the piston 68 toward the closed outer end of the hub cap, the compression spring 64 yielding to accommodate this movement. If the expansion of the grease moves the piston 68 sufficiently to uncover the grease release orifice 76 the excess grease will escape through the orifice. Whether or not any grease escapes it will be under sufficient pressure to preclude the entry of water through the grease relief orifice 76. The entry of the heated hub into cold water will be accompanied by contraction of the grease, and reduction of the pressure of the grease on the inner face of the piston 68. Accordingly the spring, being under compression, will move the piston inwardly, causing it to cover the grease release orifice 76 so that water cannot enter and applying pressure to the contracting grease. In the expansion and contraction of the grease the piston 68 is free to move back and forth under the force exerted by the grease or the spring without any hindrance due to pressure or vacuum in the portion of the hub occupied by the spring, because of the air relief vent 74.

Figure 2:
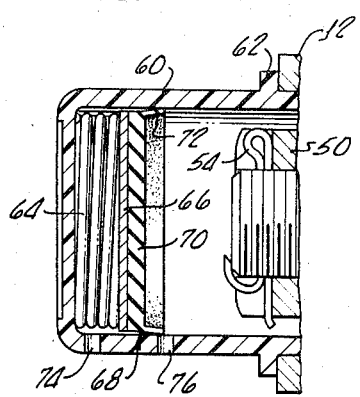
FIG. 2 is a cross-sectional view of the hub cap showing the piston in the venting position relative to the hub cap.

FIG. 2 shows the hub cap in section in the condition that there has been expansion (or displacement by the end of the spindle as the hub cap 60 is assembled to the hub 12) of the grease sufficient to partially uncover the grease relief orifice 76 to permit the escape of grease. This is, of course a momentarily existing condition, because as soon as the pressure has been relieved, the spring 64 will move the piston rightwardly to cover the orifice 76.

Figure 3:
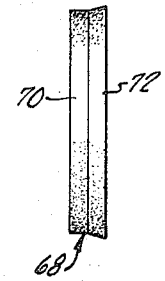
FIG. 3 is a side elevational view of the grease pressurizing piston.

FIG. 3 shows an embodiment the piston 68 apart from the hub cap 60, and the thickness of the body 70 relative to the length of the skirt 72 is indicated. Also the flare of the skirt is shown. Preferably the diameter of the body 70 of the piston 68 is such in relation to the internal diameter of the hub cap 60 that there is little if any drag between the body 70 of the piston 68 and the smooth internal surface of the plastic hub cap. The diameter of the backing disc 66 may be slightly less than the internal diameter of the hub cap, so that there is no drag whatsoever between the disc and the interior of the hub cap, since the purpose of the disc is to isolate the flexible piston 68 from direct engagement with the spring 64. The diameter of the skirt portion 72 of the piston 68 at the exposed end of the skirt is somewhat greater than the internal diameter of the hub cap 60, so that when the piston is inserted into the hub cap, the skirt 72 will undergo radial displacement or compression inwardly, so that a sealing engagement of the skirt 72 with the interior of the hub cap will be established. The grease will, itself, facilitate to-and-fro movement of the piston in the hub cap.

Preferably the end turns of the compression spring are deformed or displaced into planes substantially normal to the axis of the spring. Thus the disc 66 and piston 68, when backed against the spring 64, will occupy planes substantially normal to the axis of the hub cap 60, and they will tend to maintain this relationship with the hub cap as they move back and forth, particularly with the skirt 72 of the piston lubricated by the grease as it will be.

The hub cap structure hereinbefore described has numerous advantages. The assembly procedure pressurizes the hub and hub cap. If no grease escapes from the seal associated with the inner anti-friction bearing structure in the hub no further lubrication is required for the life of the grease and the seal components. Because the hub cap is transparent it affords a visual check on the quantity and condition of the grease in the hub. The grease release orifice 76 affords overpressure protection. The resilient piston structure with the flared skirt provides a direct low friction seal between the piston and the inner surface of the hub cap and no additional sealing component such as an O-ring is required. The thick body of the piston guards against wear in the case of contact of the piston with the end of the spindle where the nut 50 and cotter pin 54 are located. The spring 64 and backing disc 66 for the piston 68 maintain the piston substantially normal to the axis of the hub and hub cap. The spring is enclosed because the outer end of the hub cap is closed, and because of the provision for escape of grease from the hub cap through the grease relief orifice 76 to the outer surface of the hub cap, from which it may be wiped away, the spring is protected from being fouled with grease and dirt. In a preferred embodiment of the invention the air relief orifice 74 and the grease relief orifice 76 have a diameter of about 1/10 of an inch and these orifices afford little opportunity for the entry of foreign material such as dust and water.

What is claimed is:

1. A vehicle wheel hub cap comprising:
   a cylindrical cup-shaped member closed at one end and having at least two orifices extending through the wall thereof at different distances from the closed end thereof;
   a piston slidably mounted in said cylindrical member and adapted to serve as a movable wall for confining viscous lubricant in said cylindrical member; and
   a compression spring confined in said cylindrical member between the closed end thereof and said piston and adapted to the extent of its self-expansibility from fully compressed condition to maintain the piston in contact with the lubricant in said cylindrical member, one of said orifices being located between the closed end of the cylindrical member and the position of minimum distance of said piston from the closed end as permitted by said spring and the other being located in a position to be at least partially exposed by the piston and in communication with the interior of the cylindrical member between the open end thereof and the piston at least when the pistion is at minimum distance from the closed end of the cylindrical member to provide a passage only directly to the outside of the cylindrical member for lubricant unable to pass from the cylindrical member into the wheel hub.

2. A hub cap in accordance with claim 1 wherein:
   said piston is comprised of a flexible self-sustaining disc portion of substantially the same diameter as the internal diameter of the cylindrical member and an integral skirt portion of substantially uniform thickness and flaring conically to a diameter exceeding the internal diameter of the cylindrical member, said skirt portion being deformable upon insertion of the piston into the cylindrical member to effect sealing contact between the skirt portion and the internal surface of the cylindrical member.

3. A hub cap in accordance with claim 2 wherein the wall of the skirt portion of the piston has a thickness proportioned to accommodate flexure of the skirt as the piston is placed in the cylindrical member while assuring sealing contact of the skirt portion with the internal surface of the cylindrical member and the flexible disc portion has a thickness several times that of the wall of the skirt portion to render it self-sustaining and to reinforce it against wear and puncture by vehicle axle components intruding into the hub cap at its open end.

4. A vehicle wheel hub cap comprising:
a transparent plastic cylindrical cup-shaped member closed at one end and having a least two orifices in the wall thereof at different distances from the closed end thereof:
a flexible piston slidably mounted in said cylindrical member and comprised of a self-sustaining body portion and a flared skirt portion facing the open end of the cylindrical member to serve as a movable wall for confining viscous lubricant in said cylindrical member; and
a helical compression spring confined in said cylindrical member between the closed end thereof and said piston and adapted to the extent of its self-expansibility from fully compressed condition to maintain the piston in contact with the lubricant in said cylindrical member, one of said orifices being located between the closed end of the cylindrical member and the position of minimum distance of said piston from the closed end as permitted by said spring to vent the portion of the cylindrical member behind the piston to atmospheric pressure and the other being located in a position to be at least partially exposed by the piston and in direct communication with the portion of the cylindrical member between the open end thereof and the piston at least when the piston is at its minimum distance from the closed end of the cylindrical member to enable the escape of viscous lubricant from the interior of the cylindrical member directly to the outer surface thereof upon the occurrence of an over-pressure condition in said viscous lubricant.

* * * * *